US012606693B2

(12) United States Patent
Ito et al.

(10) Patent No.: US 12,606,693 B2
(45) Date of Patent: Apr. 21, 2026

(54) METHOD OF STORING ANTIOXIDANT MIXTURE

(71) Applicant: SUMITOMO CHEMICAL COMPANY, LIMITED, Tokyo (JP)

(72) Inventors: Masaki Ito, Ichihara (JP); Katsumi Sakakibara, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 232 days.

(21) Appl. No.: 18/423,847

(22) Filed: Jan. 26, 2024

(65) Prior Publication Data

US 2024/0294735 A1 Sep. 5, 2024

(30) Foreign Application Priority Data

Feb. 22, 2023 (JP) ................................ 2023-026479

(51) Int. Cl.

*C09K 15/08* (2006.01)
*C08K 5/134* (2006.01)
*C08K 5/526* (2006.01)
*C08K 5/56* (2006.01)

(52) U.S. Cl.

CPC ................ *C08K 5/56* (2013.01); *C08K 5/134* (2013.01); *C08K 5/526* (2013.01); *C09K 15/08* (2013.01)

(58) Field of Classification Search

CPC .......... C09K 15/08; C09K 15/32; C08K 5/56; C08K 5/134; C08K 5/526; C08F 210/06

See application file for complete search history.

(56) References Cited

U.S. PATENT DOCUMENTS

| | | | | | |
|---|---|---|---|---|---|
| 3,843,618 | A * | 10/1974 | Yagi | ...................... | C08F 136/06 526/143 |
| 9,447,200 | B2 * | 9/2016 | Kawamoto | ............ | C08K 5/527 |
| 11,332,610 | B2 * | 5/2022 | Okuno | .................... | C08L 65/00 |
| 2012/0149838 | A1 | 6/2012 | Kawamoto et al. | | |
| 2013/0237114 | A1 * | 9/2013 | Kawamoto | .............. | C08K 5/52 210/500.1 |
| 2014/0275414 | A1 | 9/2014 | Kawamoto et al. | | |
| 2017/0226324 | A1 * | 8/2017 | Lee | ...................... | C08K 5/5313 |

FOREIGN PATENT DOCUMENTS

| | | | | |
|---|---|---|---|---|
| CN | 106317281 | A | 1/2017 | |
| EP | 2642008 | A1 | 9/2013 | |
| EP | 4477726 | A1 * | 2/2024 | |
| JP | 2005255953 | A | 9/2005 | |
| JP | 2006282998 | A | 10/2006 | |
| JP | 2011052178 | A | 3/2011 | |
| JP | 2018090748 | A | 6/2018 | |
| WO | WO-02079275 | A1 * | 10/2002 | ............. C08L 23/02 |

OTHER PUBLICATIONS

English language machine translation of CN 1-6317281 (pub date 2017).*

* cited by examiner

*Primary Examiner* — Mark Kopec

(74) *Attorney, Agent, or Firm* — Panitch Schwarze Belisario & Nadel LLP

(57) ABSTRACT

A method of storing an antioxidant mixture includes storing an antioxidant mixture containing an antioxidant and an aluminum compound represented by the following formula (3): $AlR_3$ (3) wherein R moieties each independently represent a halogen atom or an alkyl group having 3 or more carbon atoms.

6 Claims, 2 Drawing Sheets

EXAMPLE 4

EXAMPLE 2

EXAMPLE 4

COMPARATIVE EXAMPLE 1

METHOD OF STORING ANTIOXIDANT MIXTURE

BACKGROUND OF THE INVENTION

Field of the Invention

The present invention relates to a method of storing an antioxidant mixture, which can be applied to a technology for adding an antioxidant to an olefin polymerization system.

Description of the Related Art

JP-A-2005-255953 describes a method for producing a stabilized polymer such that when an ethylenically unsaturated bond-containing monomer is polymerized using a catalyst, a phenolic antioxidant masked by triethylaluminum is added to a catalyst system or a polymerization system before or during a polymerization. Specifically, in JP-A-2005-255953, a masked phenolic antioxidant is obtained by stirring triethylaluminum and a phenolic antioxidant at 23° C. for 5 minutes, and then immediately mixing the masked phenolic antioxidant with a catalyst to carry out the polymerization of propylene ([0033], Example 1-1).

SUMMARY OF THE INVENTION

In the case of applying the prior art to continuous polymer production in a large scale factory, a predetermined amount of "masked phenolic antioxidant" needs to be stored or retained in a metal container, a metal reactor, and metal piping for a long period of time (a predetermined period of time) (examples of the kind of metal selected include stainless steel, carbon steel, aluminum, titanium, copper, or 7:3 brass). However, when the masked phenolic antioxidant is stored in contact with a metal for a long period of time, precipitation occurs. This is undesirable because it causes problems in the processing, such as attachment to a container and/or a reactor in a plant and clogging of piping. Therefore, even during long-term storage, it is necessary to keep the masked phenolic antioxidant in a solution state without causing precipitation.

Under such circumstances, the present invention has addressed the problem of providing a method of storing or retaining a "masked phenolic antioxidant" in a solution state in a middle portion of, for instance, a metal container for a long period of time (predetermined period of time) without causing precipitation.

The present inventors have conducted intensive research in view of such a background, and have completed the present invention.

Specifically, the present invention provides the following items of the present invention.

[1]

A method of storing an antioxidant mixture, comprising storing an antioxidant mixture containing an antioxidant and an aluminum compound represented by the following formula (3):

$$AlR_3 \quad (3)$$

wherein R moieties each independently represent a halogen atom or an alkyl group having 3 or more carbon atoms.

The following respective items [2] to [5] are preferable forms or embodiments of the present invention.

[2]

The method of storing an antioxidant mixture according to [1], wherein the antioxidant mixture further contains a hydrocarbon solvent.

[3]

The method of storing an antioxidant mixture according to [1] or [2], wherein the antioxidant is an antioxidant represented by the following formula (1) or formula (2):

(1)

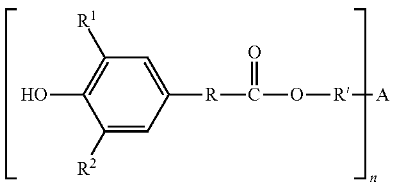

wherein:

n represents an integer of 1 to 4, $R^1$ and $R^2$ each independently represent a $C_{1-20}$ hydrocarbyl group or a hydrogen atom, R and R' each represent a $C_{1-20}$ hydrocarbylene group, and A represents a $C_{1-30}$ n-valent hydrocarbon group; or (2)

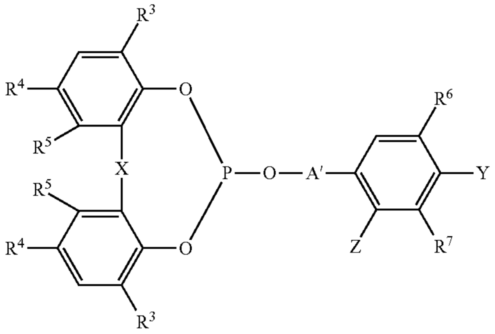

wherein:

$R^3$, $R^4$, $R^6$, and $R^7$ each independently represent a hydrogen atom, a $C_{1-8}$ alkyl group, a $C_{5-8}$ cycloalkyl group, a $C_{6-12}$ alkylcycloalkyl group, a $C_{7-12}$ aralkyl group, or a phenyl group, $R^5$ represents a hydrogen atom or a $C_{1-8}$ alkyl group, X represents a single bond, a sulfur atom, or a —$CHR^8$— group where $R^8$ represents a hydrogen atom, a $C_{1-8}$ alkyl group, or a $C_{5-8}$ cycloalkyl group, A' represents a $C_{2-8}$ hydrocarbylene group, and either one of Y or Z represents a hydroxyl group and the other represents a hydrogen atom or a $C_{1-8}$ alkyl group.

[4]

The method of storing an antioxidant mixture according to [3], wherein n in the formula (1) is 4.

[5]

The method of storing an antioxidant mixture according to any one of [1] to [4], wherein the aluminum compound is represented by the following formula (4):

$$AlR_nX_{3-n} \quad (4)$$

wherein R represents an alkyl group having 3 or more carbon atoms, X represents a halogen atom, $0<n\leq 3$, and multiple R moieties are same or different and multiple X moieties are same or different.

The present invention can provide a method of storing or retaining a “masked phenolic antioxidant” in a solution state in, for instance, a metal container for a long period of time (predetermined period of time) without causing precipitation.

DETAILED DESCRIPTION OF THE PREFERRED EMBODIMENTS

Method of Storing Antioxidant Mixture

Figure 1:
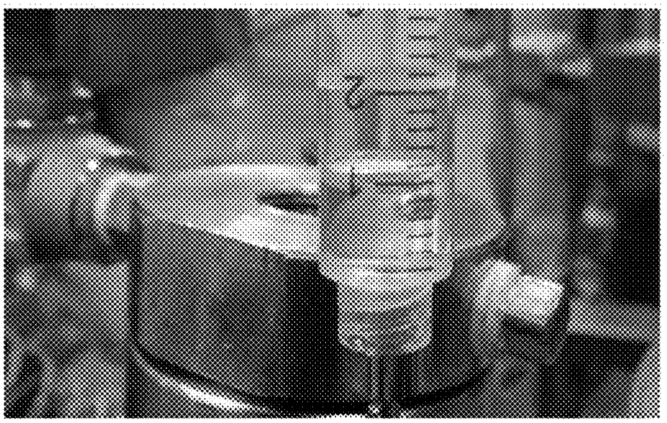
FIG. 1 shows a photograph taken and showing the state of the solution in the storage container in Example 2.

The method of storing an antioxidant mixture according to the present invention is as follows.

A method of storing an antioxidant mixture, comprising storing an antioxidant mixture containing an antioxidant and an aluminum compound represented by the following formula (3):

$$AlR_3 \quad (3)$$

wherein R moieties each independently represent a halogen atom or an alkyl group having 3 or more carbon atoms.

Preferably, the antioxidant mixture may further contain a hydrocarbon solvent.

The hydrocarbon solvent may be the same as a solvent used in the production of a heterophasic propylene polymerization material or an olefin polymer prepared using the present invention described below. For example, it is possible to use an inert hydrocarbon solvent such as propane, butane, isobutane, pentane, isopentane, hexane, heptane, octane, cyclohexane, benzene, or toluene.

Preferably, the antioxidant is an antioxidant represented by the following formula (1) or formula (2):

(1)

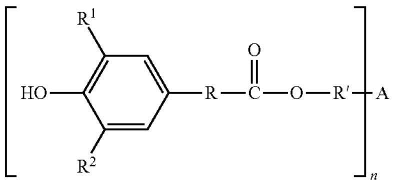

wherein:

n represents an integer of 1 to 4, $R^1$ and $R^2$ each independently represent a $C_{1-20}$ hydrocarbyl group or a hydrogen atom, R and R' each represent a $C_{1-20}$ hydrocarbylene group, and A represents a $C_{1-30}$ n-valent hydrocarbon group; or (2)

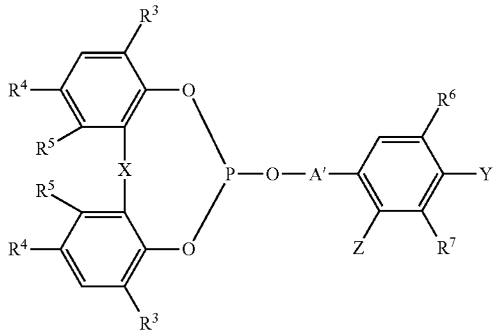

wherein:

$R^3$, $R^4$, $R^6$, and $R^7$ each independently represent a hydrogen atom, a $C_{1-8}$ alkyl group, a $C_{5-8}$ cycloalkyl group, a $C_{6-12}$ alkylcycloalkyl group, a $C_{7-12}$ aralkyl group, or a phenyl group, $R^5$ represents a hydrogen atom or a $C_{1-3}$ alkyl group, X represents a single bond, a sulfur atom, or a —$CHR^3$— group where $R^3$ represents a hydrogen atom, a $C_{1-3}$ alkyl group, or a $C_{5-8}$ cycloalkyl group, A' represents a $C_{2-3}$ hydrocarbylene group, and either one of Y or Z represents a hydroxyl group and the other represents a hydrogen atom or a $C_{1-8}$ alkyl group.

Preferably, n in the formula (1) is 1 or 4, and more preferably, n in the formula (1) is 4.

Preferably, the aluminum compound is represented by the following formula (4).

$$AlR_nX_{3-n} \quad (4)$$

wherein R represents an alkyl group having 3 or more carbon atoms, X represents a halogen atom, $0<n\leq 3$, and multiple R moieties are same or different and multiple X moieties are same or different.

It is possible to use the same solvent as a solvent used in the production of a heterophasic propylene polymerization material or olefin polymer prepared using the present invention described below. The aluminum compound is, for example, a compound having one or more carbon-aluminum bonds or halogen-aluminum bonds, and is preferably trialkylaluminum, dialkylaluminum halide, alkylaluminum dihalide, aluminum trihalide, a mixture of trialkylaluminum and dialkylaluminum halide, or alkylalumoxane, and more preferably triisobutylaluminum.

EXAMPLES OF USE IN THE PRESENT INVENTION

The method of storing an antioxidant mixture according to the present invention may be used in the production of a “contact product” in the following methods [1] to [6] for producing a heterophasic propylene polymerization material or an olefin polymer.

[1]

A method for producing a heterophasic propylene polymerization material, comprising:

a first polymerization step of forming a polymer (I) by polymerizing propylene in presence of an olefin polymerization catalyst obtained by bringing an aluminum compound into contact with an olefin polymerization-use solid catalyst component containing a titanium atom, a magnesium atom, a halogen atom, and an internal electron donor; and a second polymerization step of forming a polymer (II) by copolymerizing propylene with at least one kind selected from the group consisting of ethylene and $C_{4-12}$ α-olefins in presence of the polymer (I) and a contact product below:

the contact product obtained by bringing the aluminum compound into contact with an antioxidant represented by the following formula (1) or formula (2):

(1)

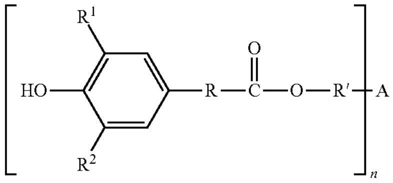

wherein:

n represents an integer of 1 to 4, $R^1$ and $R^2$ each independently represent a $C_{1-20}$ hydrocarbyl group or a hydrogen atom, R and R' each represent a $C_{1-20}$ hydrocarbylene group, and A represents a $C_{1-30}$ n-valent hydrocarbon group; or (2)

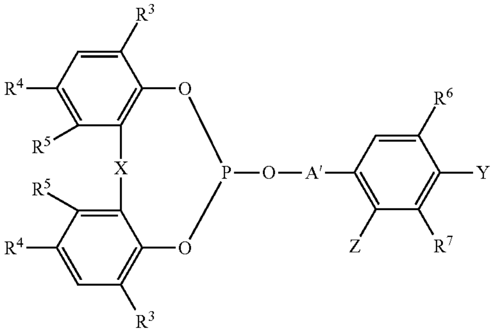

wherein:

$R^3$, $R^4$, $R^6$, and $R^7$ each independently represent a hydrogen atom, a $C_{1-8}$ alkyl group, a $C_{5-8}$ cycloalkyl group, a $C_{6-12}$ alkylcycloalkyl group, a $C_{7-12}$ aralkyl group, or a phenyl group, $R^5$ represents a hydrogen atom or a $C_{1-8}$ alkyl group, X represents a single bond, a sulfur atom, or a —$CHR^8$— group where $R^8$ represents a hydrogen atom, a $C_{1-8}$ alkyl group, or a $C_{5-8}$ cycloalkyl group, A' represents a $C_{2-8}$ hydrocarbylene group, and either one of Y or Z represents a hydroxyl group and the other represents a hydrogen atom or a $C_{1-8}$ alkyl group.

[2]

The method for producing a heterophasic propylene polymerization material according to [1], wherein the copolymerization is performed after the contact product and the polymer (I) are brought into contact with each other in the second polymerization step.

[3]

A method for producing an olefin polymer, comprising the step of:

forming an olefin polymer by continuously polymerizing at least one kind selected from the group consisting of ethylene, propylene, and $C_{4-12}$ α-olefins in presence of an olefin polymer (α) below and a contact product below:

the olefin polymer (α) obtained by polymerizing 10 kg or more and 60 kg or less of olefin per g of an olefin polymerization-use solid catalyst component, the contact product obtained by bringing the aluminum compound into contact with an antioxidant represented by the following formula (1) or formula (2):

(1)

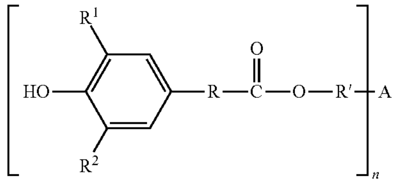

wherein:

n represents an integer of 1 to 4, $R^1$ and $R^2$ each independently represent a $C_{1-20}$ hydrocarbyl group or a hydrogen atom, R and R' each represent a $C_{1-20}$ hydrocarbylene group, and A represents a $C_{1-30}$ n-valent hydrocarbon group; or (2)

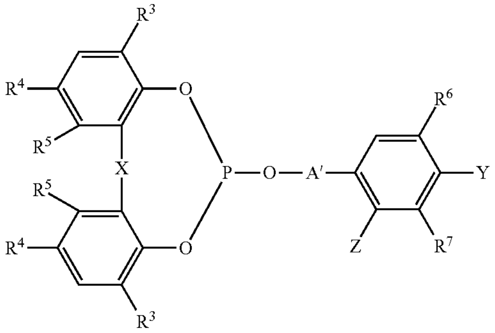

wherein:

$R^3$, $R^4$, $R^6$, and $R^7$ each independently represent a hydrogen atom, a $C_{1-8}$ alkyl group, a $C_{5-8}$ cycloalkyl group, a $C_{6-12}$ alkylcycloalkyl group, a $C_{7-12}$ aralkyl group, or a phenyl group, $R^5$ represents a hydrogen atom or a $C_{1-8}$ alkyl group, X represents a single bond, a sulfur atom, or a —$CHR^8$— group where $R^8$ represents a hydrogen atom, a $C_{1-8}$ alkyl group, or a $C_{5-8}$ cycloalkyl group, A' represents a $C_{2-8}$ hydrocarbylene group, and either one of Y or Z represents a hydroxyl group and the other represents a hydrogen atom or a $C_{1-8}$ alkyl group.

[4]

The method for producing an olefin polymer according to [3], wherein an amount of the antioxidant represented by formula (1) or formula (2) in the contact product is from 0.0001 to 1 part by weight based on 100 parts by weight of the olefin polymer (α).

[5]

The method for producing a heterophasic propylene polymerization material according to [1] or [2], wherein the heterophasic propylene polymerization material comprises:

the polymer (I) containing 80 mass % or more of a propylene-derived structural unit and having an intrinsic viscosity of 2.0 dL/g or less; and the polymer (II) containing a propylene-derived structural unit and a structural unit derived from at least one compound selected from the group consisting of ethylene and $C_{4-12}$ α-olefins and having an intrinsic viscosity of from 1.5 to 8.0 dL/g.

[6]

The method for producing a heterophasic propylene polymerization material according to [1], [2], or [5], wherein the polymer (I) has a content of from 40 to 90 mass %, and the polymer (II) has a content of from 10 to 60 mass %.

Heterophasic Propylene Polymerization Material

The heterophasic propylene polymerization material obtained by the method for producing a heterophasic propylene polymerization material in an example of use in the present invention may be produced by performing the first polymerization step of forming the polymer (I) and the second polymerization step of forming the polymer (II). The polymerization catalyst, the polymerization method, and the polymerization system adopted in these polymerization steps will be exemplified and described below.

The heterophasic propylene polymerization material preferably comprises:

the polymer (I) containing 80 mass % or more of a propylene-derived structural unit and having an intrinsic viscosity of 2.0 dL/g or less; and the polymer (II) containing a propylene-derived structural unit and a structural unit derived from at least one compound selected from the group consisting of ethylene and $C_{4-12}$ α-olefins and having an intrinsic viscosity of from 1.5 to 8.0 dL/g.

More preferably, the content of the polymer (I) is from 40 to 90 mass %, and the content of the polymer (II) is from 10 to 60 mass %.

The polymer (I) may be, for example, a propylene homopolymer or may contain a structural unit derived from a monomer other than propylene. When the polymer (I) contains a structural unit derived from a monomer other than propylene, the content thereof may be, for example, 0.01 mass % or more and less than 20 mass % based on the total mass of the polymer (I).

Examples of the monomer other than propylene include ethylene or an α-olefin having 4 or more carbon atoms. Among them, at least one compound selected from the group consisting of ethylene and $C_{4-10}$ α-olefins is preferable, at least one compound selected from the group consisting of ethylene, 1-butene, 1-hexene, and 1-octene is more preferable, and at least one compound selected from the group consisting of ethylene and 1-butene is still more preferable.

Examples of the polymer containing a structural unit derived from a monomer other than propylene include a propylene-ethylene copolymer, a propylene-1-butene copolymer, a propylene-1-hexene copolymer, a propylene-1-octene copolymer, a propylene-ethylene-1-butene copolymer, a propylene-ethylene-1-hexene copolymer, or a propylene-ethylene-1-octene copolymer.

From the viewpoint of the dimensional stability of molding, the polymer (I) is preferably a propylene homopolymer, a propylene-ethylene copolymer, a propylene-1-butene copolymer, or a propylene-ethylene-1-butene copolymer, and more preferably a propylene homopolymer.

The content of polymer (I) is preferably from 40 to 90 mass % and more preferably from 45 to 90 mass % based on the total mass of the heterophasic propylene polymerization material.

The polymer (II) preferably contains 20 mass % or more of a structural unit derived from at least one α-olefin selected from the group consisting of ethylene and $C_{4-12}$ α-olefins, and preferably contains a propylene-derived structural unit.

In the polymer (II), the structural unit derived from at least one α-olefin selected from the group consisting of ethylene and $C_{4-12}$ α-olefins may have a content of from 25 to 60 mass % or from 30 to 60 mass %.

The at least one α-olefin selected from ethylene and $C_{4-12}$ α-olefins in the polymer (II) is preferably at least one compound selected from the group consisting of ethylene and $C_{4-10}$ α-olefins, more preferably at least one compound selected from the group consisting of ethylene, 1-butene, 1-hexene, 1-octene, and 1-decene, and still more preferably at least one compound selected from the group consisting of ethylene and 1-butene.

Examples of the polymer (II) include a propylene-ethylene copolymer, a propylene-ethylene-1-butene copolymer, a propylene-ethylene-1-hexene copolymer, a propylene-ethylene-1-octene copolymer, a propylene-ethylene-1-decene copolymer, a propylene-1-butene copolymer, a propylene-1-hexene copolymer, a propylene-1-octene copolymer, or a propylene-1-decene copolymer. Among them, a propylene-ethylene copolymer, a propylene-1-butene copolymer, or a propylene-ethylene-1-butene copolymer is preferable, and a propylene-ethylene copolymer is more preferable.

The content of polymer (II) is preferably from 10 to 60 mass % and more preferably from 10 to 55 mass % based on the total mass of the heterophasic propylene polymerization material.

The content of xylene-insoluble (CXIS) component in the heterophasic propylene polymerization material is preferably from 40 to 99 mass % and more preferably from 45 to 90 mass % based on the total mass of the heterophasic propylene polymerization material.

The content of xylene-soluble (CXS) component in the heterophasic propylene polymerization material is preferably from 1 to 60 mass % and more preferably from 10 to 55 mass % based on the total mass of the heterophasic propylene polymerization material.

In this embodiment, the CXIS component in the heterophasic propylene polymerization material is mainly composed of the polymer (I), and the CXS component in the heterophasic propylene polymerization material is mainly composed of the polymer (II).

Examples of the heterophasic propylene polymerization material include (propylene)-(propylene-ethylene) polymerization material, (propylene)-(propylene-ethylene-1-butene) polymerization material, (propylene)-(propylene-ethylene-1-hexene) polymerization material, (propylene)-(propylene-ethylene-1-octene) polymerization material, (propylene)-(propylene-1-butene) polymerization material, (propylene)-(propylene-1-hexene) polymerization material, (propylene)-(propylene-1-octene) polymerization material, (propylene)-(propylene-1-decene) polymerization material, (propylene-ethylene)-(propylene-ethylene) polymerization material, (propylene-ethylene)-(propylene-ethylene-1-butene) polymerization material, (propylene-ethylene)-(propylene-ethylene-1-hexene) polymerization material, (propylene-ethylene)-(propylene-ethylene-1-octene) polymerization material, (propylene-ethylene)-(propylene-ethylene-1-decene) polymerization material, (propylene-ethylene)-(propylene-1-butene) polymerization material, (propylene-ethylene)-(propylene-1-hexene) polymerization material, (propylene-ethylene)-(propylene-1-octene) polymerization material, (propylene-ethylene)-(propylene-1-decene) polymerization material, (propylene-1-butene)-(propylene-ethylene) polymerization material, (propylene-1-butene)-(propylene-ethylene-1-butene) polymerization material, (propylene-1-butene)-(propylene-ethylene-1-hexene) polymerization material, (propylene-1-butene)-(propylene-ethylene-1-octene) polymerization material, (propylene-1-butene)-(propylene-ethylene-1-decene) polymerization material, (propylene-1-butene)-(propylene-1-butene) polymerization material, (propylene-1-butene)-(propylene-1-hexene) polymerization material, (propylene-1-butene)-(propylene-1-octene) polymerization material, (propylene-1-butene)-(propylene-1-decene) polymerization material, (propylene-1-hexene)-(propylene-1-hexene) polymerization material, (propylene-1-hexene)-(propylene-1-octene) polymerization material, (propylene-1-hexene)-(propylene-1-decene) polymerization material, (propylene-1-octene)-(propylene-1-octene) polymerization material, or (propylene-1-octene)-(propylene-1-decene) polymerization material.

Here, the term "(propylene)-(propylene-ethylene) polymerization material" means a "heterophasic propylene polymerization material in which the polymer (I) is a propylene homopolymer and the polymer (II) is a propylene-ethylene copolymer". The same applies to other analogous expressions.

The heterophasic propylene polymerization material is preferably a (propylene)-(propylene-ethylene) polymerization material, a (propylene)-(propylene-ethylene-1-butene) polymerization material, a (propylene-ethylene)-(propylene-ethylene) polymerization material, a (propylene-ethylene)-(propylene-ethylene-1-butene) polymerization material, or a (propylene-1-butene)-(propylene-1-butene) polymerization material, and more preferably a (propylene)-(propylene-ethylene) polymerization material.

The intrinsic viscosity ([η]I) of the polymer (I) is preferably from 0.10 to 2.00 dL/g, more preferably from 0.50 to 1.50 dL/g, and still more preferably from 0.70 to 1.40 dL/g.

The intrinsic viscosity ([η]II) of the polymer (II) is preferably from 1.50 to 8.00 dL/g and more preferably from 2.00 to 8.00 dL/g.

The ratio ([η]II/[η]I) of the intrinsic viscosity ([η]II) of the polymer (II) to the intrinsic viscosity ([η]I) of the polymer (I) is preferably from 1 to 20, more preferably from 1 to 10, and still more preferably from 1 to 9.

Examples of the method for measuring the intrinsic viscosity ([η]I) of the polymer (I) include a method in which the polymer (I) is formed and the intrinsic viscosity of the polymer is then measured.

The intrinsic viscosity ([η]II) of the polymer (II) can be calculated by the following formula (6) using, for example, the intrinsic viscosity ([η]whole) of the heterophasic propylene polymerization material, the intrinsic viscosity ([η]I) of the polymer (I), and the contents of the polymer (II) and the polymer (I).

$$[\eta]II = [\eta]\text{whole} - [\eta]I \times XI)/XII \quad (6)$$

[η]whole: intrinsic viscosity (dL/g) of heterophasic propylene polymerization material;

[η]I: intrinsic viscosity (dL/g) of polymer (I);

XI: ratio of the mass of polymer (I) to the total mass of heterophasic propylene polymerization material (mass of polymer (I)/mass of heterophasic propylene polymerization material); and XII: ratio of the mass of polymer (II) to the total mass of heterophasic propylene polymerization material (mass of polymer (II)/mass of heterophasic propylene polymerization material).

Here, XII was calculated by measuring the heat of fusion of the heterophasic propylene polymerization material while using the equation below. A sample (about 5 mg) of the heterophasic propylene polymerization material was filled in an aluminum pan, and placed in a differential scanning calorimeter, a DSC 8500 model apparatus (manufactured by PerkinElmer, Inc.). The temperature was raised to 230° C., and the sample was kept at 230° C. for 5 minutes; and the temperature was lowered to 0° C. at a rate of 5° C./min, and the sample was kept at 0° C. for 5 minutes. Thereafter, the temperature was raised to 200° C. at a rate of 5° C./min, and a melting curve was then measured. The temperature was corrected by setting the melting point of indium to 156.6° C. The heat of fusion (unit: J/g) was calculated from the fusion peak area in the melting curve, and XII was then determined using the following formula:

$$XII = (1 - (\text{heat of fusion of heterophasic propylene polymerization material})/105) \times 100.$$

Note that XI and XII may be calculated from the mass balance during polymerization.

The intrinsic viscosity ([η]CXIS) of the CXIS component is preferably from 0.10 to 2.00 dL/g, more preferably from 0.50 to 1.50 dL/g, and still more preferably from 0.70 to 1.40 dL/g.

The intrinsic viscosity ([η]CXS) of the CXS component is preferably from 1.50 to 8.00 dL/g and more preferably from 2.00 to 8.00 dL/g.

The ratio ([η]CXS/[η]CXIS) of the intrinsic viscosity ([η]CXS) of the CXS component to the intrinsic viscosity ([η]CXIS) of the CXIS component is preferably from 1 to 20, more preferably from 1 to 10, and still more preferably from 1 to 9.

The polymer (I) has an isotactic pentad fraction (also referred to as [mmmm] fraction) of preferably 0.950 or higher and more preferably 0.970 or higher from the viewpoint of the rigidity and dimensional stability of molding formed of the resin composition. The isotactic pentad fraction of the polymer (I) may be, for example, 1.000 or less.

The isotactic pentad fraction means an isotactic fraction in a pentad unit. That is, the isotactic pentad fraction indicates the content ratio of a structure in which five consecutive propylene-derived structural units, namely a pentad unit, are bonded in the meso configuration. Note that when the target component is a copolymer, the term refers to a value measured for a chain of propylene-derived structural units.

The isotactic pentad fraction is herein a value measured using a $^{13}$C-NMR spectrum. Specifically, the ratio of the area of the mmmm peak to the area of all the absorption peaks of the methyl carbon region as obtained by $^{13}$C-NMR spectrum was defined as the isotactic pentad fraction. The isotactic pentad fraction was measured according to a method using a $^{13}$C-NMR spectrum as described in Macromolecules, 6, 925 (1973) by A. Zambelli et al. Each absorption peak obtained by $^{13}C$-NMR spectrum was assigned based on the description of Macromolecules, 8, 687 (1975).

As used herein, the melt flow rate of the polymer (I) at a temperature of 230° C. under a load of 2.16 kgf refers to a value measured at 230° C. under a load of 2.16 kgf in accordance with JIS K6758. Meanwhile, the melt flow rate may be hereinafter referred to as MFR. The melt flow rate of the polymer (I) is preferably 3 g/10 min or more, and more preferably 10 g/10 min to 500 g/10 min from the viewpoint of molding processability of the resin composition.

The melt flow rate of the polymer (II) at a temperature of 230° C. under a load of 2.16 kgf refers to a value measured at 230° C. under a load of 2.16 kgf in accordance with JIS K6758. The melt flow rate of the polymer (II) is preferably 0.01 g/10 min or more, and more preferably 0.02 g/10 min to 20 g/10 min from the viewpoint of molding processability of the resin composition.

In the production of the polymer (I) and the polymer (II), it is possible to use, for instance, a fossil resource-derived monomer (e.g., ethylene, propylene, 1-butene, 1-hexene), a plant-derived monomer (e.g., ethylene, propylene, 1-butene, 1-hexene), or a chemical recycled monomer (e.g., ethylene, propylene, 1-butene, 1-hexene). Two or more kinds of them may be used in combination. Specific examples of the combination of monomers include fossil resource-derived ethylene/plant-derived ethylene/chemical recycled ethylene, fossil resource-derived ethylene/plant-derived ethylene/chemical recycled ethylene/fossil resource-derived 1-butene/plant-derived 1-butene/chemical recycled 1-butene, fossil resource-derived ethylene/plant-derived ethylene/chemical recycled ethylene/fossil resource-derived 1-hexene/plant-derived 1-hexene/chemical recycled 1-hexene, fossil resource-derived propylene/plant-derived propylene/chemical recycled propylene, fossil resource-derived propylene/plant-derived propylene/chemical recycled propylene/fossil resource-derived ethylene/plant-derived ethylene/chemical recycled ethylene, or fossil resource-derived propylene/plant-derived propylene/chemical recycled propylene/fossil resource-derived 1-butene/plant-derived 1-butene/chemical recycled 1-butene.

Fossil resource-derived monomers are derived from carbon as an underground resource such as petroleum, coal, or natural gas, and generally contain little carbon 14 ($^{14}C$). Examples of methods for producing fossil resource-derived monomers include known methods such as cracking of, for instance, petroleum-derived naphtha or ethane and/or dehydrogenation of, for instance, ethane or propane to produce olefins.

Plant-derived monomers are derived from carbon circulating on the ground surface as plants/animals, and generally contain a certain proportion of carbon 14 ($^{14}C$). Examples of methods for producing plant-derived monomers include known methods such as cracking of, for instance, bionaphtha, vegetable oil, or animal oil, dehydrogenation of, for instance, biopropane, or separation and dehydration of an alcohol from a product obtained by fermenting, for instance, sugar extracted from a plant raw material such as sugar cane or corn (e.g., JP-A-2010-511634, JP-A-2011-506628, JP-A-2013-503647), or a method of subjecting n-butane and ethylene obtained from plant-derived ethanol to a metathesis reaction (e.g., WO 2007/055361).

Chemical recycled monomers are derived from carbon generated by decomposition or combustion of waste, and the content of carbon 14 ($^{14}C$) content varies depending on the waste. Examples of methods for producing chemical recycled monomers include known methods such as thermal decomposition of waste plastic (e.g., JP-A-2017-512246), methods of cracking, for instance, waste vegetable oil or waste animal oil (e.g., JP-A-2018-522087), or methods of performing gasification/alcohol conversion/dehydration of waste such as garbage, biomass waste, food waste, waste oil, waste wood, paper waste, or waste plastic (e.g., JP-A-2019-167424, WO 2021/006245).

When two or more kinds of fossil resource-derived olefins, plant-derived olefins, and/or chemical recycled olefins are used, individually produced olefins may be mixed and used in a combination of fossil resource-derived olefin/plant-derived olefin, fossil resource-derived olefin/chemical recycled olefin, plant-derived olefin/chemical recycled olefin, or fossil resource-derived olefin/plant-derived olefin/chemical recycled olefin. In addition, it is possible to use, as a raw material/production intermediate of the olefin production process, a mixture produced as a combination of the above-mentioned olefins by using a combination of fossil resource-derived compound/plant-derived compound, fossil resource-derived compound/chemical recycled compound, plant-derived compound/chemical recycled compound, or fossil resource-derived compound/plant-derived compound/chemical recycled compound.

The carbon 14 ($^{14}C$) concentration of the polymer (I) or the polymer (II) is preferably 0.2 pMC (%) or higher, more preferably 0.5 pMC (%) or higher, still more preferably 1 pMC (%) or higher, still more preferably 5 pMC (%) or higher, and particularly preferably 10 pMC (%) or higher from the viewpoint of reducing the environmental load. From the viewpoint of cost, the concentration is preferably 99 pMC (%) or less, more preferably 95 pMC (%) or less, still more preferably 90 pMC (%) or less, still more preferably 70 pMC (%) or less, and particularly preferably 50 pMC (%) or less.

The carbon 14 ($^{14}C$) concentration of the polymer (I) or the polymer (II) can be adjusted by changing the ratio among the fossil resource-derived olefin, the plant-derived olefin, and the chemical recycled olefin used for producing the polyolefin resin.

Olefin Polymerization-Use Solid Catalyst Component

The heterophasic propylene polymerization material or the olefin polymer in an example of use in the present invention can be preferably produced by the following production method comprising the steps of:

bringing a component (A), a component (B), and a component (C) into contact with one another to obtain an olefin polymerization catalyst; and polymerizing an olefin in presence of the olefin polymerization catalyst to produce a heterophasic propylene polymerization material or an olefin polymer, wherein the component (A) is an olefin polymerization-use solid catalyst component containing a titanium atom, a magnesium atom, a halogen atom, and an internal electron donor;

the component (B) is an aluminum compound; and the component (C) is a silicon compound represented by the following formula (i) or (ii):

$$R^{8'}{}_{h}Si(OR^{9})_{4-h} \quad (i)$$

where $R^{8'}$ is a $C_{1-20}$ hydrocarbyl group or a hydrogen atom, $R^9$ is a $C_{1-20}$ hydrocarbyl group, h is an integer satisfying $0 \le h < 4$, and when a plurality of one or both of $R^{8'}$ and $R^9$ are present, the plurality of $R^{8'}$ or $R^9$ may be same or different; or $$R^{10}{}_2Si(NR^{11}R^{12})_2 \quad \text{(ii)}$$

where $R^{10}$ is a $C_{1-20}$ hydrocarbyl group or a hydrogen atom and $R^{11}$ and $R^{12}$ are each a $C_{1-12}$ hydrocarbyl group or a hydrogen atom.

As used herein, the wording "olefin polymerization-use solid catalyst component" means to be an olefin polymerization catalyst that is preferably present as a solid content at least in toluene and is produced by using, in combination, an olefin polymerization catalyst aid such as an aluminum compound.

Part or all of the titanium atoms in the olefin polymerization-use solid catalyst component are derived from a titanium halide compound. Part or all of the halogen atoms in the olefin polymerization-use solid catalyst component are derived from a titanium halide compound.

Part or all of the magnesium atoms in the olefin polymerization-use solid catalyst component are derived from a magnesium compound. The magnesium compound may be a magnesium atom-containing compound, and specific examples thereof include compounds represented by the following formulas (iii) to (v):

$$MgR^{13}{}_kX_{2-k} \quad \text{(iii)}$$

$$Mg(OR^{13})_mX_{2-m} \quad \text{(iv)}$$

$$MgX_2 \bullet nR^{13}OH \quad \text{(v)}$$

where k is a number satisfying $0 \le k \le 2$; m is a number satisfying $0 < m \le 2$; n is a number satisfying $0 \le n \le 3$; $R^{13}$ is a $C_{1-20}$ hydrocarbyl group; and X is a halogen atom.

Examples of X in the above formulas (iii) to (v) include a chlorine atom, a bromine atom, an iodine atom, or a fluorine atom. Here, a chlorine atom is preferable. Each X may be the same or different.

Specific examples of the magnesium compound represented by any of the formulas (iii) to (v) include magnesium dialkoxide or magnesium halide.

The magnesium halide used may be a commercially available magnesium halide as it is. A precipitate generated by dropping a solution, which is obtained by dissolving a commercially available magnesium halide in alcohol, into a hydrocarbon liquid may be separated from the liquid and used. The magnesium halide may be produced based on the method described in U.S. Pat. No. 6,825,146, WO-A-1998/044009, WO-A-2003/000754, WO-A-2003/000757, or WO-A-2003/085006.

Examples of the method for producing magnesium dialkoxide include a method in which metallic magnesium and an alcohol are brought into contact with each other in the presence of a catalyst (e.g., JP-A-04-368391, JP-A-03-74341, JP-A-08-73388, WO-A-2013/058193). Examples of the alcohol include methanol, ethanol, propanol, butanol, or octanol. Examples of the catalyst include halogen (e.g., iodine, chlorine, bromine); or a magnesium halide (e.g., magnesium iodide, magnesium chloride). Preferred is iodine.

The magnesium compound may be supported on a carrier. Examples of the carrier include a porous inorganic oxide (e.g., $SiO_2$, $Al_2O_3$, MgO, $TiO_2$, $ZrO_2$); or an organic porous polymer (e.g., polystyrene, a styrene-divinylbenzene copolymer, a styrene-ethylene glycol dimethacrylic acid copolymer, polymethyl acrylate, polyethyl acrylate, a methyl acrylate-divinylbenzene copolymer, polymethyl methacrylate, a methyl methacrylate-divinylbenzene copolymer, polyacrylonitrile, an acrylonitrile-divinylbenzene copolymer, polyvinyl chloride, polyethylene, polypropylene). Among them, a porous inorganic oxide is preferable, and $SiO_2$ is more preferable.

The carrier is preferably porous from the viewpoint of effectively immobilizing a magnesium compound on the carrier. More preferred is a porous carrier in which the total volume of pores having a pore radius of 10 to 780 nm determined by a mercury intrusion method according to the standard ISO 15901-1: 2005 is 0.2 $cm^3/g$ or more. Still more preferred is a porous carrier with the total volume of 0.3 $cm^3/g$ or more. In addition, preferred is a porous carrier in which the total volume of pores having a pore radius of 10 to 780 nm is 15% or more based on the total volume of pores having a pore radius of 2 to 100 μm. More preferred is a porous carrier with the total volume of 20% or more.

The magnesium compound may be used singly or two or more kinds thereof may be used in combination. The magnesium compound may be brought into contact with a titanium halide compound solution in the form of a magnesium compound slurry containing a magnesium compound and a solvent as long as the effects are exerted in an example of use in the present invention, or may be brought into contact in a solvent-free form.

Part or all of the magnesium atoms in the olefin polymerization-use solid catalyst component are derived from a magnesium compound. In addition, part of the halogen atoms in the olefin polymerization-use solid catalyst component is derived from a magnesium compound.

The internal electron donor means an organic compound capable of donating an electron pair to one or more metal atoms contained in the olefin polymerization-use solid catalyst component. Specific examples thereof include a monoester compound, a dicarboxylic acid ester compound, a diol diester compound, a β-alkoxy ester compound, or a diether compound.

In addition, the examples also include the internal electron donor described in JP-A-2011-246699.

Among them, a dicarboxylic acid ester compound, a β-alkoxy ester compound, or a diether compound is preferable. The internal electron donor may be used singly or two or more kinds thereof may be used in combination.

The olefin polymerization-use solid catalyst component may be produced by the following method for producing an olefin polymerization-use solid catalyst component, the method comprising:

step (I) of bringing a titanium halide compound into contact with a magnesium compound to obtain a slurry containing a solid product.

Preferably, in step (I) of the method for producing an olefin polymerization-use solid catalyst component, the magnesium compound is added to the titanium halide compound-containing solution; the internal electron donor is at least one compound selected from the group consisting of a monoester compound, a dicarboxylic acid ester compound, a diol diester compound, a β-alkoxy ester compound, and a diether compound; and the magnesium compound is magnesium dialkoxide. The method may further comprise step (II) of adding an internal electron donor to the slurry containing the solid product.

Olefin Polymerization Catalyst

In one embodiment, the olefin polymerization catalyst may be produced by bringing the olefin polymerization-use solid catalyst component into contact with an aluminum compound, for example, by a known procedure. Also, in another embodiment, the olefin polymerization catalyst may be produced by bringing the olefin polymerization-use solid catalyst component into contact with an aluminum compound and an external electron donor.

As a result, in one embodiment, the olefin polymerization catalyst contains the olefin polymerization-use solid catalyst component and an aluminum compound. Alternatively, in another embodiment, the olefin polymerization catalyst contains the olefin polymerization-use solid catalyst component, an aluminum compound, and an external electron donor.

The aluminum compound is a compound having one or more carbon-aluminum bonds or halogen-aluminum bonds, and specific examples thereof include the compound described in JP H10-A-212319 or aluminum trihalide ($AlX_3$: X is halogen). Among them, the aluminum compound is preferably trialkylaluminum, dialkylaluminum halide, alkylaluminum dihalide, aluminum trihalide, a mixture of trialkylaluminum and dialkylaluminum halide, or alkylalumoxane, and more preferably triethylaluminum.

Examples of the external electron donor can include each compound described in JP-B-2950168, JP-A-2006-96936, JP-A-2009-173870, or JP-A-2010-168545. Among them, an oxygen-containing compound or a nitrogen-containing compound is preferable. Examples of the oxygen-containing compound include an alkoxysilicon compound, ether, ester, or ketone. Among them, an alkoxysilicon compound or ether is preferable. Examples of the nitrogen-containing compound include aminosilicon, amine, imine, amide, imide, or cyan. Among them, an aminosilicon compound is preferable.

The alkoxysilicon compound or the aminosilicon compound as the external electron donor is preferably a silicon compound represented by the following formula such that the component (C) is a silicon compound represented by the following formula (i) or (ii):

$$R^{8'}{}_{h}Si(OR^{9})_{4-h} \quad (i)$$

where $R^{8'}$ is a $C_{1-20}$ hydrocarbyl group or a hydrogen atom, $R^9$ is a $C_{1-20}$ hydrocarbyl group, h is an integer satisfying $0 \leq h < 4$, and when a plurality of one or both of $R^{8'}$ and $R^9$ are present, the plurality of $R^{8'}$ or $R^9$ may be same or different; or $$R^{10}{}_{2}Si(NR^{11}R^{12})_{2} \quad (ii)$$

where $R^{10}$ is a $C_{1-20}$ hydrocarbyl group or a hydrogen atom and $R^{11}$ and $R^{12}$ are each a $C_{1-12}$ hydrocarbyl group or a hydrogen atom.

Examples of the hydrocarbyl group of $R^{8'}$ or $R^9$ in the above formula (i) include an alkyl group, an aralkyl group, an aryl group, or an alkenyl group. Examples of the alkyl group of $R^{8'}$ or $R^9$ include a linear alkyl group (e.g., a methyl, ethyl, n-propyl, n-butyl, n-pentyl, n-hexyl, n-heptyl, or n-octyl group); a branched alkyl group (e.g., an iso-propyl, iso-butyl, tert-butyl, iso-pentyl, neopentyl, or 2-ethylhexyl group); or a cyclic alkyl group (e.g., a cyclopropyl, cyclobutyl, cyclopentyl, cyclohexyl, cycloheptyl, or cyclooctyl group). Preferred is a linear, branched, or cyclic $C_{1-20}$ alkyl group. Examples of the aralkyl group of $R^{8'}$ or $R^9$ include a benzyl group or a phenethyl group, and a $C_{7-20}$ aralkyl group is preferable. Examples of the aryl group of $R^{8'}$ or $R^9$ include a phenyl group, a tolyl group, or a xylyl group, and a $C_{6-20}$ aryl group is preferable. Examples of the alkenyl group of $R^{8'}$ or $R^9$ include a linear alkenyl group (e.g., a vinyl, allyl, 3-butenyl, or 5-hexenyl group); a branched alkenyl group (e.g., an iso-butenyl or 5-methyl-3 pentenyl group); or a cyclic alkenyl group (e.g., a 2-cyclohexenyl or 3-cyclohexenyl group). Preferred is a $C_{2-10}$ alkenyl group.

Specific examples of the alkoxysilicon compound represented by the above formula (i) include cyclohexylmethyldi, methoxysilane, cyclohexylethyldimethoxysilane, diisopropyldimethoxysilane, tert-butyl ethyl dimethoxysilane, tert-butyl n-propyl dimethoxysilane, phenyltrimethoxysilane, triethoxyphenylsilane, diphenyldimethoxysilane, dicyclobutyldimethoxysilane, dicyclopentyldimethoxysilane, tetraethoxysilane, methyltriethoxysilane, ethyltriethoxysilane, isobutyltriethoxysilane, vinyltriethoxysilane, sec-butyltriethoxysilane, cyclohexyltriethoxysilane, or cyclopentyltriethoxysilane. Preferred is tert-butyl n-propyl dimethoxysilane.

Examples of the hydrocarbyl group of $R^{10}$ in the above formula (ii) include the same groups as of $R^{8'}$ or $R^9$ in the above formula.

Examples of the hydrocarbyl group of $R^{11}$ or $R^{12}$ in the above formula (ii) include an alkyl group or an alkenyl group. Examples of the alkyl group of $R^{11}$ or $R^{12}$ include a linear alkyl group (e.g., a methyl, ethyl, n-propyl, n-butyl, n-pentyl, or n-hexyl group); a branched alkyl group (e.g., an iso-propyl, iso-butyl, tert-butyl, iso-pentyl, or neopentyl group); or a cyclic alkyl group (e.g., a cyclopropyl, cyclobutyl, cyclopentyl, or cyclohexyl group). Preferred is a $C_{1-6}$ linear alkyl group. Examples of the alkenyl group of $R^4$ or $R^5$ include a linear alkenyl group (e.g., a vinyl, allyl, 3-butenyl, or 5-hexenyl group); a branched alkenyl group (e.g., an iso-butenyl or 5-methyl-3 pentenyl group); or a cyclic alkenyl group (e.g., a 2-cyclohexenyl or 3-cyclohexenyl group). A linear $C_{2-6}$ alkenyl group is preferable, and a methyl group or an ethyl group is particularly preferable.

Specific examples of the aminosilicon compound represented by the above formula (ii) include bis(ethylamino)dicyclopentylsilane, bis(ethylamino)diisopropylsilane, or bis(methylamino)di-tert-butylsilane. Preferable examples include bis(ethylamino)dicyclopentylsilane.

The aminosilicon compound described in WO-A-2006/129773 can also be exemplified.

The ether as the external electron donor is preferably a cyclic ether compound. The cyclic ether compound is a heterocyclic compound having at least one —C—O—C— bond in the ring structure, more preferably a cyclic ether compound having at least one —C—O—C—O—C— bond in the ring structure, and particularly preferably 1,3-dioxolane or 1,3-dioxane.

The external electron donor may be used singly or two or more kinds thereof may be used in combination.

The process of bringing the olefin polymerization-use solid catalyst component into contact with an aluminum compound and an external electron donor is not particularly limited as long as the olefin polymerization catalyst can be generated. The contact is carried out in the presence or absence of a solvent. The contact mixture may be fed into a polymerization reactor; each component may be separately supplied to a polymerization reactor and brought into contact in the polymerization reactor; or the contact mixture of any two components and the rest components may be separately supplied to a polymerization reactor and brought into contact in the polymerization reactor.

The amount of aluminum compound used is usually from 0.01 to 1000 μmol and preferably from 0.1 to 700 μmol, based on 1 mg of the olefin polymerization-use solid catalyst component.

The amount of the external electron donor used is usually from 0.0001 to 1000 μmol, preferably from 0.001 to 500 μmol, and more preferably from 0.01 to 150 μmol, based on 1 mg of the olefin polymerization-use solid catalyst component.

Method for Forming Olefin Polymerization Catalyst

In the production method in an example of use in the present invention, an olefin is polymerized in the presence of the above-described olefin polymerization catalyst.

In one embodiment, the method for forming an olefin polymerization catalyst may preferably include the following steps:

- step (i) of polymerizing a small amount of olefin (the same as or different from an olefin used in the main polymerization step (usually referred to as main polymerization)) in the presence of an olefin polymerization-use solid catalyst component and an aluminum compound (optionally with an external electron donor and/or a chain transfer agent such as hydrogen so as to adjust the molecular weight of olefin polymer to be produced) to produce a catalyst component, the surface of which is covered with a polymer of the olefin (this polymerization is usually referred to as prepolymerization, and thus the catalyst component is usually referred to as a prepolymerization catalyst component); and
- step (ii) of bringing the prepolymerization catalyst component into contact with the aluminum compound and the external electron donor.

The prepolymerization is preferably slurry polymerization using, as a solvent, inert hydrocarbon such as propane, butane, isobutane, pentane, isopentane, hexane, heptane, octane, cyclohexane, benzene, or toluene.

The amount of aluminum compound used in step (i) above is usually from 0.5 mol to 700 mol, preferably from 0.8 mol to 500 mol, and particularly preferably from 1 mol to 200 mol, based on 1 mol of titanium atoms in the solid catalyst component used in step (i).

The amount of olefin to be prepolymerized is usually from 0.01 g to 1000 g, preferably from 0.05 g to 500 g, and particularly preferably from 0.1 g to 200 g, based on 1 g of the olefin polymerization-use solid catalyst component used in step (i).

The slurry concentration of olefin polymerization-use solid catalyst component during slurry polymerization in step (i) is preferably 1 to 500 g of olefin polymerization-use solid catalyst component/L of solvent, and particularly preferably 3 to 300 g of olefin polymerization-use solid catalyst component/L of solvent.

The temperature of the prepolymerization is preferably from −20° C. to 100° C., and particularly preferably from 0° C. to 80° C. The partial pressure of olefin in the gas phase during the prepolymerization is preferably from 0.01 MPa to 2 MPa, and particularly preferably from 0.1 MPa to 1 MPa, but this is not the case for an olefin that is liquid at the pressure or temperature of the prepolymerization. The prepolymerization time is preferably 2 minutes to 15 hours.

Examples of a method of supplying an olefin polymerization-use solid catalyst component, an aluminum compound, and an olefin to a polymerization reactor during prepolymerization include the following methods (1) and (2):

- method (1) of supplying an olefin after supplying an olefin polymerization-use solid catalyst component and an aluminum compound; and
- method (2) of supplying an aluminum compound after supplying an olefin polymerization-use solid catalyst component and an olefin.

Examples of a method of supplying an olefin to a polymerization reactor during prepolymerization include the following methods (1) and (2):

- method (1) of sequentially supplying an olefin to a polymerization reactor so as to maintain a pressure in a polymerization reactor at a predetermined pressure; and
- method (2) of supplying, as one portion, the whole volume of predetermined amount of olefin to a polymerization reactor.

The amount of external electron donor used during prepolymerization is usually from 0.01 mol to 400 mol, preferably from 0.02 mol to 200 mol, and particularly preferably from 0.03 mol to 100 mol, based on 1 mol of titanium atoms contained in the olefin polymerization-use solid catalyst component, and is usually from 0.003 mol to 50 mol, preferably from 0.005 mol to 30 mol, and particularly preferably from 0.01 mol to 10 mol, based on 1 mol of the aluminum compound.

Examples of a method of supplying an external electron donor to a polymerization reactor during prepolymerization include the following methods (1) and (2):

- method (1) of supplying an external electron donor alone to a polymerization reactor; and
- method (2) of supplying a contact material containing an external electron donor and an aluminum compound to a polymerization reactor.

The amount of aluminum compound used in the main polymerization is usually from 1 mol to 1000 mol, and particularly preferably from 5 mol to 600 mol, based on 1 mol of titanium atoms in the olefin polymerization-use solid catalyst component.

When an external electron donor is used in the main polymerization, the amount of external electron donor used is usually from 0.1 mol to 2000 mol, preferably from 0.3 mol to 1000 mol, and particularly preferably from 0.5 mol to 800 mol, based on 1 mol of titanium atoms contained in the olefin polymerization-use solid catalyst component, and is usually from 0.001 mol to 5 mol, preferably from 0.005 mol to 3 mol, and particularly preferably from 0.01 mol to 1 mol, based on 1 mol of the aluminum compound.

The temperature of the main polymerization is usually from −30° C. to 300° C., and preferably from 20° C. to 180° C. The polymerization pressure is not particularly limited, and is generally from normal pressure to 10 MPa and preferably from about 200 kPa to 5 MPa from the viewpoint of industrial and economic efficiency. The polymerization is batch-type or continuous polymerization, and examples of the polymerization process include a slurry polymerization process or a solution polymerization process using, as a solvent, inert hydrocarbon (e.g., propane, butane, isobutane, pentane, hexane, heptane, octane), a bulk polymerization process using, as a medium, an olefin that is liquid at the polymerization temperature, or a gas phase polymerization process.

In order to adjust the molecular weight of polymer produced by the main polymerization, a chain transfer agent (e.g., hydrogen, alkyl zinc (e.g., dimethyl zinc, diethyl zinc)) may be used.

Method for Producing Heterophasic Propylene Polymerization Material

In an example of use in the present invention, a method for producing a heterophasic propylene polymerization material is as follows:

a method for producing a heterophasic propylene polymerization material, comprising:

a first polymerization step of forming a polymer (I) by polymerizing propylene in presence of an olefin polymerization-use catalyst obtained by bringing an aluminum compound into contact with an olefin polymerization-use solid catalyst component containing a titanium atom, a magnesium atom, a halogen atom, and an internal electron donor; and a second polymerization step of forming a polymer (II) by copolymerizing propylene with at least one kind selected from the group consisting of ethylene and $C_{4-12}$ α-olefins in presence of the polymer (I) and a contact product below:

the contact product obtained by bringing the aluminum compound into contact with an antioxidant represented by the following formula (1) or formula (2):

(1)

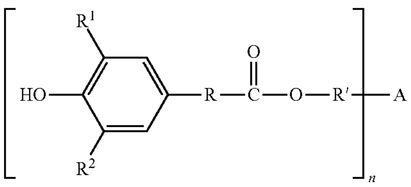

wherein:

n represents an integer of 1 to 4, $R^1$ and $R^2$ each independently represent a $C_{1-20}$ hydrocarbyl group or a hydrogen atom, R and R' each represent a $C_{1-20}$ hydrocarbylene group, and A represents a $C_{1-30}$ n-valent hydrocarbon group; or (2)

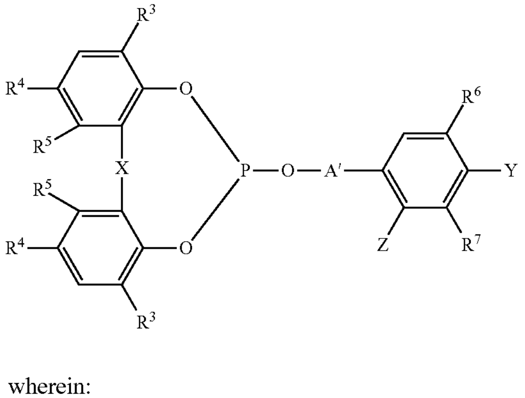

wherein:

$R^3$, $R^4$, $R^6$, and $R^7$ each independently represent a hydrogen atom, a $C_{1-8}$ alkyl group, a $C_{5-8}$ cycloalkyl group, a $C_{6-12}$ alkylcycloalkyl group, a $C_{7-12}$ aralkyl group, or a phenyl group, $R^5$ represents a hydrogen atom or a $C_{1-8}$ alkyl group, X represents a single bond, a sulfur atom, or a —$CHR^8$— group where $R^8$ represents a hydrogen atom, a $C_{1-8}$ alkyl group, or a $C_{5-8}$ cycloalkyl group, A' represents a $C_{2-8}$ hydrocarbylene group, and either one of Y or Z represents a hydroxyl group and the other represents a hydrogen atom or a $C_{1-8}$ alkyl group.

Preferably, the copolymerization may be performed after the contact product and the polymer (I) are brought into contact with each other in the second polymerization step.

In the method for producing a heterophasic propylene polymerization material according to an example of use in the present invention, propylene, for example, is polymerized in the presence of the olefin polymerization catalyst.

An example of the method for producing a heterophasic propylene polymerization material will be described. This production method includes the first and second polymerization steps.

First polymerization step: at least one step selected from the group consisting of step 1-a of polymerizing a propylene-containing monomer in a liquid phase under a condition where a hydrogen/propylene ratio is appropriate to obtain at least part of a propylene-based polymer (a) and step 1-b of polymerizing a propylene-containing monomer in a gas phase under a condition where a hydrogen/propylene ratio is appropriate to obtain at least part of a propylene-based polymer (a); and second polymerization step: a step of polymerizing a monomer containing propylene and at least one α-olefin selected from the group consisting of ethylene and $C_{4-12}$ α-olefins under a condition where a hydrogen/propylene ratio is appropriate to obtain a propylene-based copolymer (b).

Provided that as used herein, the hydrogen/propylene ratio is defined as follows.

In the case of polymerization in the liquid phase, the hydrogen/propylene ratio refers to the ratio of the substance amount of hydrogen as a gas to the substance amount of propylene as a liquid in the reactor supply unit.

In the case of polymerization in the gas phase, the hydrogen/propylene ratio refers to the ratio of the substance amount of hydrogen as a gas to the substance amount of propylene as a gas at the reactor outlet.

As used herein, for example, the phrase "the hydrogen/propylene ratio is 1 mol ppm" has the same meaning as "the hydrogen/propylene ratio is $1\times10^{-6}$ mol/mol", and means that $1\times10^{-6}$ mol of hydrogen is present per mol of propylene.

The hydrogen/propylene ratio is usually from 0.00001 to 10 mol/mol, preferably from 0.0001 to 1 mol/mol, and more preferably from 0.001 to 0.5 mol/mol.

[Step 1-a]

In step 1-a, for example, a liquid phase polymerization reactor may be used to polymerize a propylene-containing monomer in the presence of a polymerization catalyst and hydrogen. The configuration of the monomer used for polymerization may be adjusted, if appropriate, based on the type and content of the structural unit constituting the propylene-based polymer (a). The content of propylene in the monomer may be, for example, 80 mass % or more, 90 mass % or more, or 100 mass % based on the total mass of the monomer.

Examples of the liquid-phase polymerization reactor include a loop-type liquid phase reactor or a vessel-type liquid phase reactor.

Examples of the polymerization catalyst include a Ziegler-Natta catalyst or a metallocene catalyst, and a Ziegler-Natta catalyst is preferable. The Ziegler-Natta type catalyst is, for example, a catalyst containing the above-described olefin polymerization-use solid catalyst component, an aluminum compound, and an electron donating compound. A catalyst pre-activated by bringing a small amount of olefin into contact may also be used as a polymerization catalyst.

The polymerization catalyst used may be a prepolymerization catalyst component obtained by prepolymerizing an olefin in the presence of, for example, the above-described olefin polymerization-use solid catalyst component, n-hexane, triethylaluminum, and/or tert-butyl n-propyl dimethoxysilane. The olefin used in the prepolymerization is preferably any of the olefins constituting the heterophasic propylene polymerization material.

The polymerization temperature may be, for example, from 0 to 120° C. The polymerization pressure may be, for example, from normal pressure to 10 MPaG.

Step 1-a may be carried out continuously at multiple stages in series while using multiple reactors.

[Step 1-b]

In step 1-b, for example, a gas-phase polymerization reactor may be used to polymerize a propylene-containing monomer in the presence of a polymerization catalyst and hydrogen. The configuration of the monomer used for polymerization may be adjusted, if appropriate, based on the type and content of the structural unit constituting the propylene-based polymer (a). The content of propylene in the monomer may be, for example, 80 mass % or more, 90 mass % or more, or 100 mass % based on the total mass of the monomer.

Examples of the gas-phase polymerization reactor include a vessel-type reactor, a fluidized-bed-type reactor, or a spouted-bed-type reactor.

The gas-phase polymerization reactor may be a multistage gas-phase polymerization reactor having a plurality of reaction zones connected in series. The multistage gas-phase polymerization reactor may be a multistage gas-phase polymerization reactor having a plurality of polymerization tanks connected in series. According to such an apparatus, it is considered to be easy to adjust the intrinsic viscosity of the propylene-based polymer (a) to the above range.

The multistage gas-phase polymerization reactor may include, for example, a cylindrical section extending in a vertical direction and a tapered section formed and tapered downward in the cylindrical section and having a gas introduction opening at a lower end, and may be provided with: a spouted-bed-type olefin polymerization reaction zone having a spouted layer formed inside and surrounded by an inner surface of the tapered section and an inner surface of the cylindrical section disposed above the tapered section; and a fluidized-bed-type olefin polymerization reaction zone.

The multistage gas-phase polymerization reactor preferably has a plurality of reaction zones in the vertical direction. The multistage gas-phase polymerization reactor has, for example, a plurality of reaction zones in the vertical direction from the viewpoint of the intrinsic viscosity of the propylene-based polymer (a). Preferably, the uppermost stage is a fluidized-bed-type olefin polymerization reaction zone, and the rest are a plurality of spouted-bed-type olefin polymerization reaction zones. In such an apparatus, for example, a solid component is supplied from an upper part of the apparatus, and a gas component is supplied from a lower part of the apparatus, thereby forming a fluidized bed or a spouted bed in the corresponding reaction zone. The gas component may contain an inert gas (e.g., nitrogen) in addition to the propylene-containing monomer and hydrogen. In the apparatus, the number of spouted-bed-type olefin polymerization reaction zones is preferably 3 or more.

When the plurality of reaction zones are disposed in the vertical direction, the reaction zone(s) in the lower stage may be arranged obliquely downward of the reaction zone (s) in the upper stage. In such an apparatus, for example, the solid component obtained in an upper reaction zone is discharged in the obliquely downward direction, and the discharged solid component is supplied to a lower reaction zone from the obliquely upward direction. In this case, for example, the gas component discharged from the upper part of the lower reaction zone is supplied from the lower part of the upper reaction zone.

Specific examples of the polymerization catalyst are as described above.

The polymerization temperature may be, for example, from 0 to 120° C., from 20 to 100° C., or from 40 to 100° C. The polymerization pressure may be, for example, from normal pressure to 10 MPaG or from 1 to 5 MPaG.

[Second Polymerization Step]

The second polymerization step may be performed in a liquid phase or a gas phase, but is performed in a gas phase, for example. In the case of a liquid phase, for example, a liquid phase reactor (e.g., a loop-type or vessel-type reactor) may be used. In the case of a gas phase, for example, a gas phase reactor (e.g., a vessel-type reactor, a fluidized-bed-type reactor, a spouted-bed-type reactor) may be used.

The second polymerization step includes polymerizing a monomer containing propylene and at least one α-olefin selected from the group consisting of ethylene and $C_{4-12}$ α-olefins in the presence of a polymerization catalyst and hydrogen. The composition of the monomer used for polymerization may be adjusted, if appropriate, based on the type and content of the structural unit constituting the propylene-based copolymer (b). The content of at least one α-olefin selected from the group consisting of ethylene and $C_{4-12}$ α-olefins in the monomer used for polymerization may be, for example, from 30 to 55 mass % or from 35 to 50 mass % based on the total mass of the monomer.

Specific examples of the polymerization catalyst are as described above.

In the case of polymerization in a liquid phase, the polymerization temperature is, for example, from 40 to 100° C., and the polymerization pressure is, for example, from normal pressure to 5 MPaG. In the case of polymerization in a gas phase, the polymerization temperature is, for example, from 40 to 100° C., and the polymerization pressure is, for example, from 0.5 to 5 MPaG.

The propylene-based polymer (a) and the propylene-based copolymer (b) may be prepared in the respective steps, the polymerization catalyst may be deactivated, and the propylene-based polymer (a) and the propylene-based copolymer (b) may then be mixed in a solution state, a molten state, or the like. However, a polymer may be continuously prepared by supplying the resulting polymer to the next step without deactivating the catalyst. When polymerization is continuously performed without deactivating the catalyst, the polymerization catalyst in the previous step also acts as a polymerization catalyst in the subsequent step.

The order of the first polymerization step and the second polymerization step is not particularly limited. The first polymerization step may include steps 1-a and 1-b.

The production method according to this embodiment may include, in sequence, step 1-a, step 1-b, and the second polymerization step. Step 1-b may not be included.

Method for Producing Olefin Polymer

In an example of use in the present invention, a method for producing an olefin polymer is as follows:

a method for producing an olefin polymer, comprising the step of:

forming an olefin polymer by continuously polymerizing at least one kind selected from the group consisting of ethylene, propylene, and $C_{4-12}$ α-olefins in presence of an olefin polymer (α) below and a contact product below:

the olefin polymer (α) obtained by polymerizing 10 kg or more and 60 kg or less of olefin per g of an olefin polymerization-use solid catalyst component, the contact product obtained by bringing the aluminum compound into contact with an antioxidant represented by the following formula (1) or formula (2):

(1)

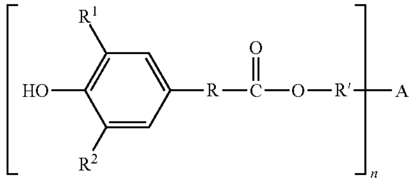

wherein:

n represents an integer of 1 to 4, $R^1$ and $R^2$ each independently represent a $C_{1-20}$ hydrocarbyl group or a hydrogen atom, R and R' each represent a $C_{1-20}$ hydrocarbylene group, and A represents a $C_{1-30}$ n-valent hydrocarbon group; or (2)

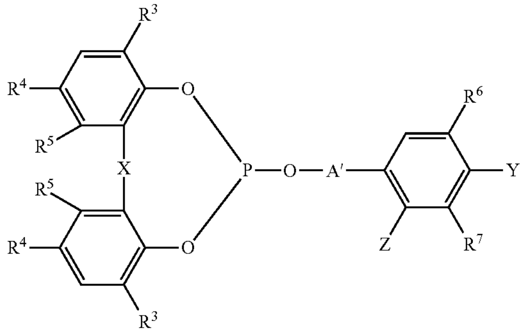

wherein:

$R^3$, $R^4$, $R^6$, and $R^7$ each independently represent a hydrogen atom, a $C_{1-8}$ alkyl group, a $C_{5-8}$ cycloalkyl group, a $C_{6-12}$ alkylcycloalkyl group, a $C_{7-12}$ aralkyl group, or a phenyl group, $R^5$ represents a hydrogen atom or a $C_{1-8}$ alkyl group, X represents a single bond, a sulfur atom, or a —$CHR^8$— group where $R^8$ represents a hydrogen atom, a $C_{1-8}$ alkyl group, or a $C_{5-8}$ cycloalkyl group, A' represents a $C_{2-8}$ hydrocarbylene group, and either one of Y or Z represents a hydroxyl group and the other represents a hydrogen atom or a $C_{1-8}$ alkyl group.

In the method for producing an olefin polymer according to an example of use in the present invention, the amount of antioxidant in the contact product may be preferably from 0.0001 to 1 part by weight, more preferably from 0.001 to 0.5 parts by weight, and still more preferably from 0.002 to 0.3 parts by weight, based on 100 parts by weight of the olefin polymer (c).

In the method for producing an olefin polymer according to an example of use in the present invention, the “step of forming an olefin polymer by continuous polymerization” may be a step equivalent to the “second polymerization step” in the method for producing a heterophasic propylene polymerization material according to an example of use in the present invention.

The olefin polymer (ca) is preferably a “propylene polymer”, and more preferably the polymer (I). The olefin polymer (α) may be produced by a step equivalent to the “first polymerization step” in the method for producing a heterophasic propylene polymerization material according to an example of use in the present invention.

In an example of use in the present invention, the method for producing an olefin polymer is preferably the method for producing a heterophasic propylene polymerization material.

Olefin Polymer

In an example of use in the present invention, the olefin polymer obtained through the method for producing an olefin polymer is preferably the above heterophasic propylene polymerization material.

Antioxidant

The antioxidant used in the production method in an example of use in the present invention is an antioxidant represented by the following formula (1) or formula (2):

(1)

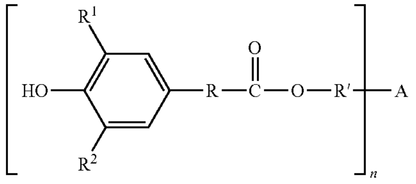

wherein:

n represents an integer of 1 to 4, $R^1$ and $R^2$ each independently represent a $C_{1-20}$ hydrocarbyl group or a hydrogen atom, R and R' each represent a $C_{1-20}$ hydrocarbylene group, and A represents a $C_{1-30}$ n-valent hydrocarbon group; or (2)

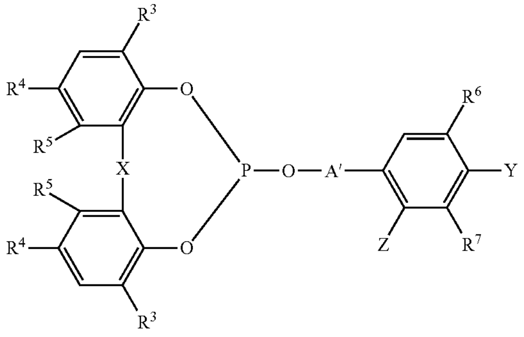

wherein:

$R^3$, $R^4$, $R^6$, and $R^7$ each independently represent a hydrogen atom, a $C_{1-8}$ alkyl group, a $C_{5-8}$ cycloalkyl group, a $C_{6-12}$ alkylcycloalkyl group, a $C_{7-12}$ aralkyl group, or a phenyl group, $R^5$ represents a hydrogen atom or a $C_{1-8}$ alkyl group, X represents a single bond, a sulfur atom, or a —$CHR^8$— group where $R^8$ represents a hydrogen atom, a $C_{1-8}$ alkyl group, or a $C_{5-8}$ cycloalkyl group, A' represents a $C_{2-8}$ hydrocarbylene group, and either one of Y or Z represents a hydroxyl group and the other represents a hydrogen atom or a $C_{1-8}$ alkyl group.

In the above formula, preferably n=1 or 4.

Examples of the antioxidant represented by formula (1) or an antioxidant which is not represented by formula (1) but can be used in the present invention include the following:

2,6-di-tert butyl-4-ethylphenol, 2-tert-butyl-4,6-dimethylphenol, styrenated phenol, 2,2'-methylenebis(4-ethyl-6-tert-butylphenol), 2,2'-thiobis-(6-tert-butyl-4-methylphenol), 2,2'-thiodiethylenebis[3-(3,5-di-tert-butyl 4-hydroxyphenyl)propionate], 2-methyl-4,6-bis(octylsulfanylmethyl)phenol, 2,2'-isobutylidenebis(4,6-dimethylphenol), isooctyl 3-(3,5-di-tert-butyl-4-hydroxyphenyl)propionate, N,N'-(hexan-1,6-diyl)bis[3-(3,5-di-tert-butyl-4-hydroxyphenyl)propionamide, 2,2'-oxamide-bis[ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethylenebis(4,6-di-tert-butylphenol), a $C_{13-15}$ alkyl ester of 3,5-bis(1,1-dimethylethyl)-4-hydroxy-benzenepropanoic acid, 2,5-di-tert-amylhydroquinone, a polymer of hindered phenol (trade name: AO·OH. 998; manufactured by Palmarole), 2,2'-methylenebis[6-(1-methylcyclohexyl)-p-cresol], 2-tert-butyl-6-(3-tert-butyl-2 hydroxy-5-methylbenzyl-4-methylphenylacrylate, 2-[1-(2-hydroxy-3,5-di-tert-pentylphenyl)ethyl]-4,6-di-tert-pentylphenylacrylate hexamethylenebis[3-(3,5-di-tert-butyl-4-hydroxyphenyl)propionate], bis[monoethyl(3,5-di-tert-butyl-4 hydroxybenzyl)phosphonate calcium salt, a reaction product of 5,7-bis(1,1-dimethylethyl)-3 hydroxy-2(3H)-benzofuranone with o-xylene, 2,6-di-tert-butyl-4-(4,6-bis(octylthio)-1,3,5-triazin-2-ylamino phenol, DL-α-tocopherol (vitamin E), 2,6-bis(α-methylbenzyl)-4-methylphenol, bis [3,3-bis-(4'-hydroxy-3'-tert-butylphenyl)butylate]glycol ester, 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, tridecyl-3,5-di-tert-butyl-4-hydroxybenzylthioacetate, thiodiethylenebis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6 tert-butylphenol), bis[3,3-bis(4-hydroxy-3 tert-butylphenyl) butyric acid] glycol ester,4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris (2-methyl-4-hydroxy-5-tert-butylphenyl)butane, bis[2-tert-butyl-6-(2-hydroxy-3-tert-butyl-5-methylbenzyl)-4 methylphenyl]terephthalate, 1,3,5-tris(2,6-dimethyl-3-hydroxy-4-tert-butylbenzyl)isocyanuate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris [(3,5-di-tert-butyl-4-hydroxyphenyl)propionyloxyethyl] isocyanurate, pentaerythritol tetrakis[3-(3',5'-di-tert-butyl-4'-hydroxyphenyl)propionate], octadecyl 3-(3,5-di-tert-butyl-4-hydroxyphenyl)propionate, 2-tert-butyl-4 methyl-6-(2-acryloyloxy-3-tert-butyl-5-methylbenzyl)phenol, 3,9-bis [2-(3-tert-butyl-4-hydroxy-5-methylhydrocinnamoyloxy)-1,1-dimethylethyl]-2,4,8,10-tetraoxaspiro[5.5]undecane, triethylene glycol bis[β-(3-tert-butyl-4-hydroxy-5-methylphenyl)propionate], stearyl-3-(3,5-di-tert-butyl-4-hydroxyphenyl)propionamide, palmityl-3-(3,5-di-tert-butyl-4-hydroxyphenyl)propionate amide, myristyl-3-(3,5-di-tert-butyl-4-hydroxyphenyl)propionamide, lauryl-3-(3,5-di-tert-butyl-4 hydroxyphenyl)propionamide, or mixtures thereof.

Examples of the particularly preferred phenolic antioxidant include pentaerythritol tetrakis[3-(3',5'-di-tert-butyl-4'-hydroxyphenyl)propionate] or octadecyl 3-(3,5-di-tert-butyl-4-hydroxyphenyl)propionate.

Examples of the antioxidant represented by formula (2) include those described in Japanese Patent No. 4193223. Examples of the particularly preferred phenol phosphite-based antioxidant include 6-[3-[3-(3-tert-butyl-4 hydroxy-5-methylphenyl)propoxy]-2,4,8,10-tetra-tert-butyl dibenzi [d,f][1,3,2]dioxaphosphepine.

In addition, a phosphorus-based antioxidant may be used in combination with the formula (1) or (2). Examples of the phosphorus-based antioxidant include the following:

triphenyl phosphite, tris(nonylphenyl)phosphite, tris (2,4-di-tert-butylphenyl)phosphite, trilauryl phosphite, trioctadecyl phosphite, triisodecyl phosphite, triisooctyl phosphite, distearyl pentaerythritol diphosphite, diisodecyl pentaerythritol diphosphite, bis(2,4-di-tert-butylphenyl)pentaerythritol diphosphite, bis(2,4-di-tert-butyl-6-methylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, tristearyl sorbitol triphosphite, tetrakis(2,4-di-tert-butylphenyl)-4,4'-diphenylene diphosphonite, 2,2'-methylenebis(4,6-di-tert-butylphenyl)-2-ethylhexyl phosphite, 2,2'-ethylidenebis(4,6-di-tert-butylphenyl)fluorophosphite, bis(2,4-di-tert-butyl-6-methylphenyl)ethyl phosphite, bis(2,4-di-tert-butyl-6-methylphenyl)methyl phosphite, 2-(2,4,6-tri-tert-butylphenyl)-5-ethyl-5-butyl-1,3,2-oxaphospholinane, 2,2',2"-nitrilo[triethyl-tris(3,3',5,5'-tetra-tert-butyl-1,1'-biphenyl-2,2'-diyl)phosphite, or mixtures thereof.

Examples of the particularly preferred phosphorus-based antioxidant include tris(2,4-di-tert-butylphenyl)phosphite.

Antioxidant Mixture Containing Antioxidant and Aluminum Compound Represented by Formula (3)

In the present invention, the aluminum compound represented by the formula (3) may be preferably the same as the aluminum compound in the olefin polymerization catalyst, and is more preferably triisobutylaluminum.

The antioxidant mixture can be obtained by bringing the aluminum compound and the antioxidant into contact at a ratio of 0.1 to 20 mmol, preferably 1 to 15 mmol, of the aluminum compound based on 1 g of the antioxidant.

The antioxidant mixture can be considered not only as a simple mixed solution but also as a contact product resulting from a reaction. The chemical structural formula of the contact product is not necessarily clear. However, one example may be a contact product with an antioxidant masked by a reaction of an aluminum compound with a —OH group in the antioxidant as in the following reaction scheme (scheme of reaction of the antioxidant represented by formula (1) with an aluminum compound ($AlEt_3$: triethylaluminum)).

[Scheme A]

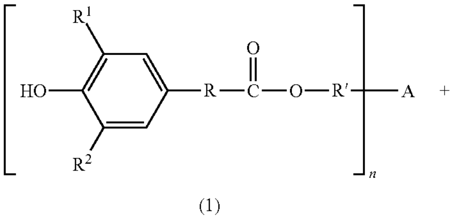

(1)

-continued

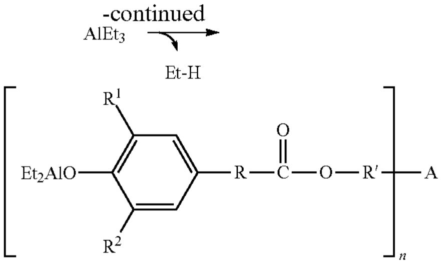

EXAMPLES

Hereinafter, the present invention will be described more specifically with reference to Examples and Comparative Example. However, the invention is not limited to the Examples below.

<Antioxidant Used>

(1) Irganox 1010

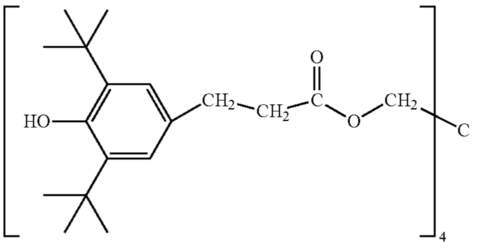

Pentaerythritol tetrakis[3-(3',5'-di-tert-butyl-4'-hydroxyphenyl)propionate]
Phenolic antioxidant
Molecular weight: 1178

(2) Irgafos 168

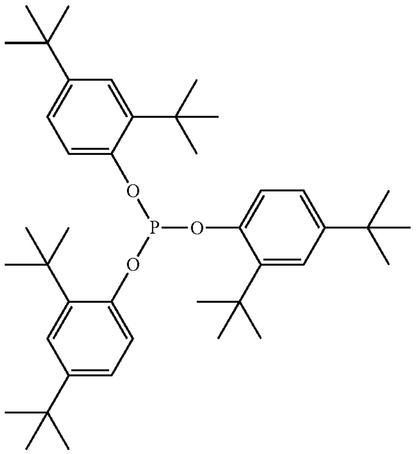 [SMILES: CC(C)(C)c1ccc(OP(Oc2ccc(C(C)(C)C)cc2C(C)(C)C)Oc2ccc(C(C)(C)C)cc2C(C)(C)C)c(C(C)(C)C)c1]

Tris(2,4-di-tert-butylphenyl)phosphite
Phosphite-based antioxidant
Molecular weight: 647

(3) Irganox 1076

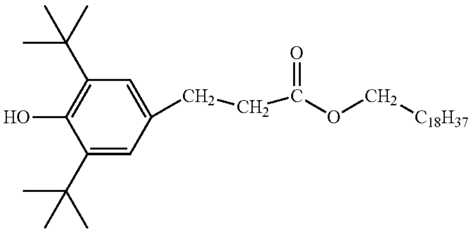

Octadecyl 3-(3,5 di-tert-butyl-4-hydroxyphenyl)propionate
Phenolic antioxidant
Molecular weight: 531

Figure 2:
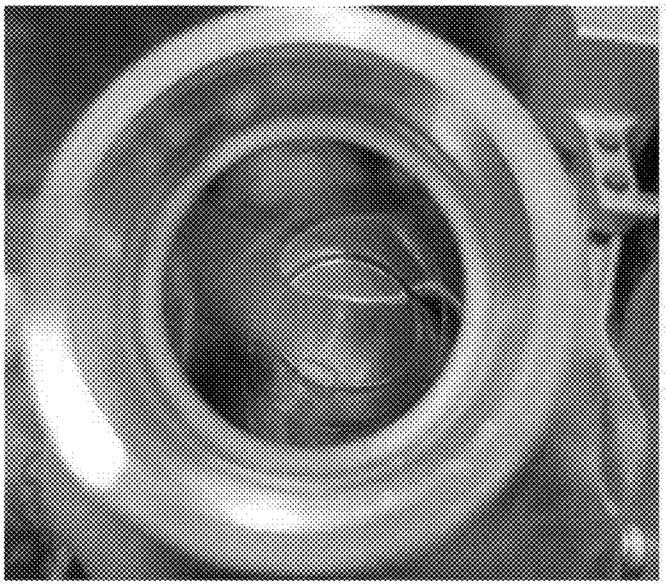
FIG. 2 shows a photograph taken and showing how the inside of a storage container looked in Example 4.
Figure 3:
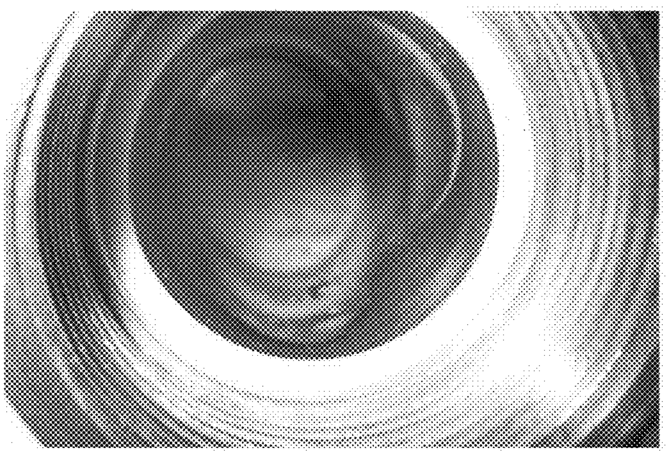
FIG. 3 shows a photograph taken and showing how the inside of a storage container looked in Comparative Example 1.

The inside of a storage container made of a material designated in Table 1 was replaced with nitrogen gas. Next, an antioxidant, hexane, and a hexane solution containing an organoaluminum compound (1 mol/L) were added, at a ratio shown in Table 1, to the storage container, and the mixture was then stirred for 5 minutes. Subsequently, the mixture was allowed to stand at a storage pressure (gauge pressure and pressurization with argon) shown in Table 1 at 15 to 25° C. for a storage period, and the presence or absence of precipitation was then visually checked. It is presumed that the precipitation is generated due to insolubilization by a reaction and oxygen crosslinking between a hydroxy group in the antioxidant and an alkyl group of the organoaluminum compound to increase the molecular weight or form a network structure. The present invention exerts an effect of effectively suppressing the reaction. No precipitation was found in Examples 1 to 6 in which an organoaluminum compound, where R is an alkyl group having 4 carbon atoms (alkyl group having 3 or more carbon atoms), was used. Precipitation was found in Comparative Example 1 in which an organoaluminum compound, where R is an alkyl group having 2 carbon atoms (alkyl group not having 3 or more carbon atoms), was used. FIG. 1 or FIG. 2 is a photograph showing the state of the solution in the storage container in Example 2 or 4, respectively. No precipitation was found in any of the Examples. FIG. 3 is a photograph showing the state of the solution in the storage container in Comparative Example 1. Precipitation was found in Comparative Example 1.

TABLE 1

| | Storage container | Antioxidant | | Hexane (mL) | $AlR_3$ hexane solution (mL) | R of $AlR_3$ | Storage pressure (MPa) | Storing time | Precipitation |
|---|---|---|---|---|---|---|---|---|---|
| Example 1 | Stainless steel-made | Irganox 1010<br>Irgafos 168 | 0.6 g<br>1.2 g | 18 | 6 | $^{i}$Bu | 0.4 | 1 day | None |
| Example 2 | Stainless steel-made | Irganox 1010<br>Irgafos 168 | 0.6 g<br>1.2 g | 18 | 6 | $^{i}$Bu | 0.4 | 5 days | None |
| Example 3 | Stainless steel-made | Irganox 1010<br>Irgafos 168 | 0.3 g<br>0.6 g | 9 | 3 | $^{i}$Bu | 0.8 | 4 days | None |
| Example 4 | Stainless steel-made | Irganox 1076<br>Irgafos 168 | 0.6 g<br>0.6 g | 9 | 3 | $^{i}$Bu | 0.4 | 4 days | None |
| Example 5 | Stainless steel-made | Irganox 1010<br>Irgafos 168 | 0.3 g<br>0.6 g | 9 | 3 | $^{i}$Bu | 0.2 | 4 days | None |
| Example 6 | Stainless steel-made | Irganox 1010<br>Irgafos 168 | 0.3 g<br>0.6 g | 9 | 3 | $^{i}$Bu | <0.1 | 7 days | None |
| Comparative Example 1 | Stainless steel-made | Irganox 1010<br>Irgafos 168 | 0.3 g<br>0.6 g | 6 | 3 | Et | 0.4 | 30 min | Present |

INDUSTRIAL APPLICABILITY

The present invention allows a "masked phenolic antioxidant" to be stored or retained in a solution state in, for instance, a metal container for a long period of time (predetermined period of time) without causing precipitation. Therefore, it is possible to eliminate processing problems caused by precipitation during continuous polymer production in a large-scale factory. The present invention can be used in production of, for instance, a heterophasic propylene polymerization material or an olefin polymer. For example, the heterophasic propylene polymerization material or the olefin polymer obtained by using the present invention is suitably used for applications such as various automobile interior and exterior parts (e.g., instrument panels, glove boxes, trims, housings, pillars, bumpers, fenders, back doors containing an injection molding material), various parts of home electric appliances, various housing equipment components, various industrial components, or various building material components. The present invention is thus highly applicable to various fields of industries such as transport machine industry, electrical and electronic industry, and building and construction industry.

What is claimed is:

1. A method of storing an antioxidant mixture, comprising storing an antioxidant mixture containing an antioxidant and an aluminum compound represented by the following formula (3):

$$AlR_3 \quad (3)$$

wherein R moieties each independently represent a halogen atom or an alkyl group having 3 or more carbon atoms, wherein the antioxidant is an antioxidant represented by the following formula (1) or formula (2):

(1)

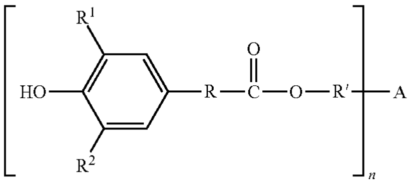

wherein:

n represents an integer of 1 to 4, $R^1$ and $R^2$ each independently represent a $C_{1-20}$ hydrocarbyl group or a hydrogen atom, R and R' each represent a $C_{1-20}$ hydrocarbylene group, and A represents a $C_{1-30}$ n-valent hydrocarbon group; or (2)

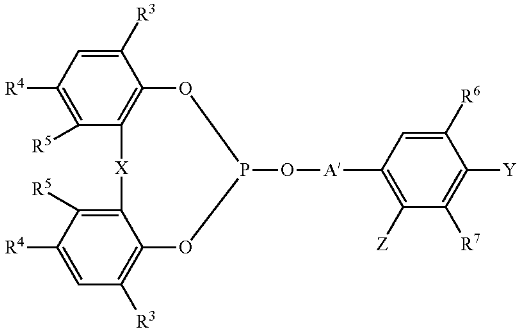

wherein:

$R^3$, $R^4$, $R^6$, and $R^7$ each independently represent a hydrogen atom, a $C_{1-8}$ alkyl group, a $C_{5-8}$ cycloalkyl group, a $C_{6-12}$ alkylcycloalkyl group, a $C_{7-12}$ aralkyl group, or a phenyl group, $R^5$ represents a hydrogen atom or a $C_{1-8}$ alkyl group, X represents a single bond, a sulfur atom, or a —$CHR^8$— group where $R^8$ represents a hydrogen atom, a $C_{1-8}$ alkyl group, or a $C_{5-8}$ cycloalkyl group, A' represents a $C_{2-8}$ hydrocarbylene group, and either one of Y or Z represents a hydroxyl group and the other represents a hydrogen atom or a $C_{1-8}$ alkyl group, and wherein the antioxidant mixture is suitable for olefin polymerization.

2. The method of storing an antioxidant mixture according to claim 1, wherein the antioxidant mixture further contains a hydrocarbon solvent.

3. The method of storing an antioxidant mixture according to claim 1, wherein n in the formula (1) is 4.

4. The method of storing an antioxidant mixture according to claim 1, wherein the aluminum compound is represented by the following formula (4):

$$AlR_nX_{3-n} \quad (4)$$

wherein R represents an alkyl group having 3 or more carbon atoms, X represents a halogen atom, $0<n\leq 3$, and multiple R moieties are same or different and multiple X moieties are same or different.

5. The method of storing an antioxidant mixture according to claim 1, wherein the olefin polymerization is a continuous olefin polymerization.

6. The method of storing an antioxidant mixture according to claim 5, wherein the continuous olefin polymerization is a continuous polymer production in a large scale factory.

* * * * *